United States Patent
Kwak et al.

(10) Patent No.: US 10,428,563 B2
(45) Date of Patent: Oct. 1, 2019

(54) POP-UP STRUCTURE OF TAIL GATE

(71) Applicant: Hyundai Motor Company, Seoul (KR)

(72) Inventors: Sang Moon Kwak, Hwaseong-si (KR); Seung Yeol Ryu, Seoul (KR); Jungmin Eom, Incheon (KR)

(73) Assignee: Hyundai Motor Company, Seoul (KR)

( * ) Notice: Subject to any disclaimer, the term of this patent is extended or adjusted under 35 U.S.C. 154(b) by 198 days.

(21) Appl. No.: 15/298,523

(22) Filed: Oct. 20, 2016

(65) Prior Publication Data

US 2017/0254123 A1    Sep. 7, 2017

(30) Foreign Application Priority Data

Mar. 2, 2016    (KR) .................... 10-2016-0025321

(51) Int. Cl.
| | |
|---|---|
| *E05B 83/18* | (2014.01) |
| *E05B 81/20* | (2014.01) |
| *B62D 33/037* | (2006.01) |
| *E05B 81/14* | (2014.01) |
| *E05B 17/00* | (2006.01) |

(52) U.S. Cl.
CPC ............ *E05B 83/18* (2013.01); *B62D 33/037* (2013.01); *E05B 17/0033* (2013.01); *E05B 81/14* (2013.01); *E05B 81/20* (2013.01)

(58) Field of Classification Search
CPC .......... E05B 83/18; E05B 81/20; E05B 81/14; E05B 17/0033; B62D 33/037
USPC ........................................... 296/50
See application file for complete search history.

(56) References Cited

U.S. PATENT DOCUMENTS

| | | | |
|---|---|---|---|
| 7,258,373 B2 * | 8/2007 | Plett ..................... | B60P 1/26 |
| | | | 292/210 |
| 9,221,499 B1 * | 12/2015 | Marchlewski ........ | E05B 79/02 |

FOREIGN PATENT DOCUMENTS

| | | | |
|---|---|---|---|
| JP | 2008-214913 A | | 9/2008 |
| JP | 4850752 B2 | | 1/2012 |
| JP | 4917919 B2 | | 4/2012 |
| KR | 10-2005-0047415 A | | 5/2005 |
| KR | 10-1451083 B1 | | 10/2014 |
| KR | 10-2015-0106290 A | | 9/2015 |
| KR | 10-2015-0141843 A | | 12/2015 |
| KR | 10-2016-0021401 A | | 2/2016 |

* cited by examiner

*Primary Examiner* — Joseph D. Pape
*Assistant Examiner* — Dana D Ivey
(74) *Attorney, Agent, or Firm* — Morgan, Lewis & Bockius LLP

(57) ABSTRACT

A pop-up structure of a tail gate may include a tail gate disposed to open and close a passage of a vehicle body, a striker to be fixed to the vehicle body, a locking device mounted on the tail gate and locked to the striker to fix the tail gate to the vehicle body, and a pop-up device disposed at the tail gate and pushing against the striker by a predetermined distance to lift the tail gate by a corresponding predetermined height when the locking device is unlocked from the striker, in which the pop-up device may include a bracket mounted on the tail gate, a pop-up lever rotatably disposed about a pop-up lever pin on the bracket, a rotation lever rotatably disposed about a rotation lever pin, and a push home pushing the striker, and a pop-up lever spring elastically supporting the pop-up lever to rotate in one direction.

10 Claims, 7 Drawing Sheets

POP-UP STRUCTURE OF TAIL GATE

CROSS-REFERENCE TO RELATED APPLICATION

The present application claims priority to Korean Patent Application No. 10-2016-0025321, filed Mar. 2, 2016, the entire contents of which is incorporated herein for all purposes by this reference.

BACKGROUND OF THE INVENTION

Field of the Invention

The present invention relates to a pop-up structure of a tail gate, which fixes a tail gate in a locking state and opens the tail gate to a preset level in a state where a locking state of the tail gate is released, thereby improving a user's convenience.

Description of Related Art

Currently, a locking structure of a tail gate or a trunk in a general vehicle is implemented by an assembling structure between a striker installed on a vehicle body and a ratchet plate installed at the tail gate. As the ratchet plate is rotated, the striker and the ratchet plate are either locked to each other or separated from each other. A user presses a switch to open the tail gate, and the switch rotates the ratchet plate to release the locking state between the tail gate and the ratchet plate. Then, the tail gate is opened in the vehicle. Although the locking state between the ratchet plate and the striker is released through the rotation of the ratchet plate, the user must lift the tail gate from the vehicle body using a relatively large amount of effort, because the tail gate is pressed against the vehicle body through a weather strip.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a pop-up structure of a tail gate, which has advantages of lifting a tail gate to a preset level through a pop-up lever installed in a locking device when a locking structure between a striker and a ratchet plate is released, thereby improving a user's convenience and reducing an amount of strength required for lifting the tail gate.

According to various aspects of the present invention, a pop-up structure of a tail gate may include a tail gate disposed to open and close a passage of a vehicle body, a striker to be fixed to the vehicle body, a locking device mounted on the tail gate and locked to the striker to fix the tail gate to the vehicle body, and a pop-up device disposed at the tail gate and pushing against the striker by a predetermined distance to lift the tail gate by a corresponding predetermined height when the locking device is unlocked from the striker, in which the pop-up device may include a bracket mounted on the tail gate, a pop-up lever rotatably disposed about a pop-up lever pin on the bracket, a rotation lever rotatably disposed about a rotation lever pin which is disposed on an end portion extended to a first side from the pop-up lever, and a push home pushing the striker is formed on a front end portion and moving along a guide slit formed on the bracket through a guide pin on a rear end portion to rotate in one direction about the rotation lever pin, and a pop-up lever spring elastically supporting the pop-up lever to rotate in the one direction such that the striker disposed on the push home of the rotation lever is separated outward from the bracket.

A locking bump may be formed at an end portion extended to a second side from the pop-up lever, and a pop-up pawl disposed to rotate about a pop-up pawl pin on the bracket and having a stopper supporting the locking bump at one side end portion so that the pop-up lever does not rotate in the one direction may be included.

The pop-up structure of the tail gate may further include a lock lever rotatably disposed about a push lever pin disposed on the bracket and a front end portion disposed to support a support portion of the pop-up pawl, a push lever rotatably disposed about the push lever pin and a front end portion disposed to contact an outer surface of the push home at the rotate lever, and a push lever spring respectively connected to and pulling a rear end portion of the push lever and a rear end portion of the lock lever so that the lock lever interrupts rotation of the pop-up pawl in the one direction and the stopper of the pop-up pawl supports the locking bump of the pop-up lever by a pulling tension force.

A push pin may be disposed on the front end portion of the push lever, and the push pin may be disposed to contact an upper side surface of the rotate lever.

In a state in which the stopper of the pop-up pawl supports the locking bumper of the pop-up lever to restrict the pop-up lever from rotating in the one direction and the striker supports inside upper side surface of the push home upwardly so that the rotation lever is rotated to another direction about the rotation lever pin, the guide slit may include a first slit formed along a predetermined first radius about the rotation lever pin and having a width within which the guide pin is movable, and a second slit connected to the upper end portion of the first slit and formed along a predetermined second radius about the pop-up lever pin and having a width within which the guide pin is movable.

The guide slit may include a first slit formed along a predetermined curvature from a lower side to an upper side, and a second slit formed to the lower side along a predetermined curvature at the upper end portion to the direction the striker is disposed.

The push lever spring may pull the rear end portion of the push lever to apply elastic force such that the front end of the push lever pushes the rotation lever outward.

The pop-up structure of the tail gate may further include a pop-up pawl spring disposed on the bracket and elastically supporting the pop-up pawl to rotate in the other direction to apply elastic force so that the stopper of the pop-up pawl is separated from the locking bump.

The locking device may include a ratchet plate disposed to rotate through a ratchet pin at the bracket, and a latchet home in which the striker is inserted and locked is formed at one side, and a first locking bump is formed at an outside thereof, a locking lever disposed to rotate about the stopper pin at the bracket, and a locking stopper supporting the first locking bump at a front end portion and preventing the ratchet plate from rotating in the one direction is formed, and a hatch spring rotating the ratchet plate in the one direction to apply elastic force so that the striker is output from the ratchet home of the ratchet plate.

The pop-up structure of the tail gate may further include a driver pulling or pushing one side of the locking lever so that the first stopper is separated from the first locking bump, and a switch generating signal operating the driver.

According to various embodiments of the present invention, when the locking structure between the striker and the ratchet plate is released, the pop-up lever and the rotation lever installed in the locking device may push the striker and lift the tail gate to a predetermined level, thereby improving a user's convenience and reducing an amount of strength required for lifting the tail gate.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
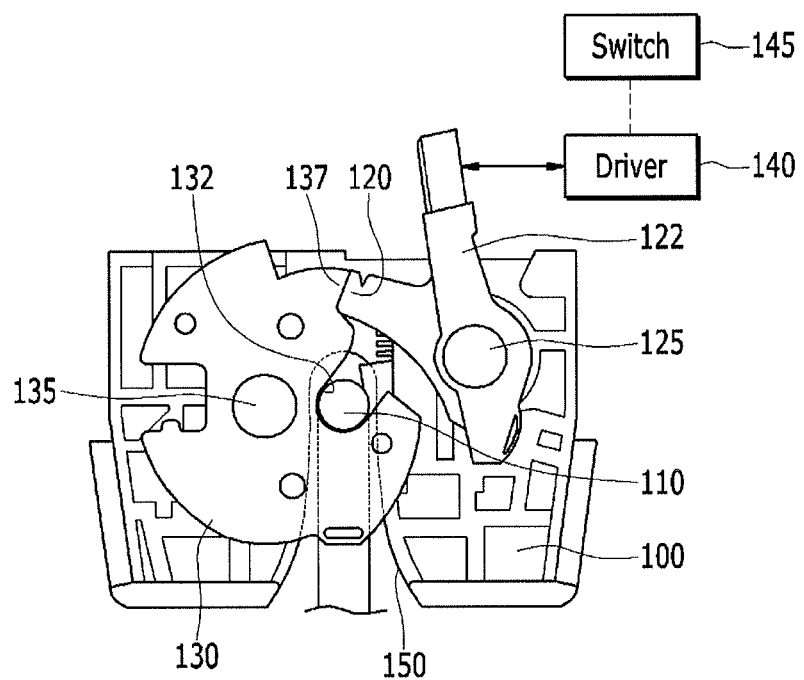
FIG. 1 is an internal front view illustrating a locking structure of a tail gate according to various embodiments of the present invention.

FIG. 1 is an internal front view illustrating a locking structure of a tail gate according to various embodiments of the present invention.

Referring to FIG. 1, a pop-up structure of a tail gate includes a bracket 100, a striker 110, a stopper pin 125, a locking lever 122, a driver 140, a switch 145, a first stopper 120, a first locking bump 137, a ratchet home 132, a ratchet pin 135, a ratchet plate 130 and an entry home 150.

The bracket 100 is disposed on the tail gate, the entry home 150 is formed at the lower end portion toward the upper side, the striker 110 enters into the entry home 150, and the striker 110 is inserted and engaged to the ratchet home 132 of the ratchet plate 130.

The ratchet plate 130 is rotatably disposed to the left side of the entry home 150 through the ratchet pin 135, and the first locking bump 137 is formed at one side of the ratchet plate 130. Further, the ratchet plate 130 has a structure rotating in the clockwise direction by a hatch spring.

The locking lever 122 is rotatably disposed to the right side of the entry home 150 through the stopper pin 125, and the first stopper 120 is formed at one side of the locking lever 122. Here, the first stopper 120 supports the first locking bumper 137 of the ratchet plate 130 to prevent the ratchet plate 130 from rotating in the clockwise direction.

In a state that the first stopper 120 supports the first locking bump 137, the ratchet home 132 faces upward and prevents the striker 110 inserted in the ratchet home 132 from being separated in the downward direction to implement the locking structure.

The driver 140 is disposed to pull or push the front end portion of the locking lever 122, the first stopper 120 is separated from the first locking bump 137 when the driver 140 pulls the front end portion of the locking lever 122 by signal of the switch 145, and the ratchet plate 130 rotates in the clockwise direction about the ratchet pin 135 by a hatch spring.

Further, the ratchet home 132 of the ratchet plate 130 faces the downward direction when the ratchet plate 130 rotates in the clockwise direction, and the striker 110 moves to the downward direction along the entry home 150 so that the locking structure releases.

Figure 2:
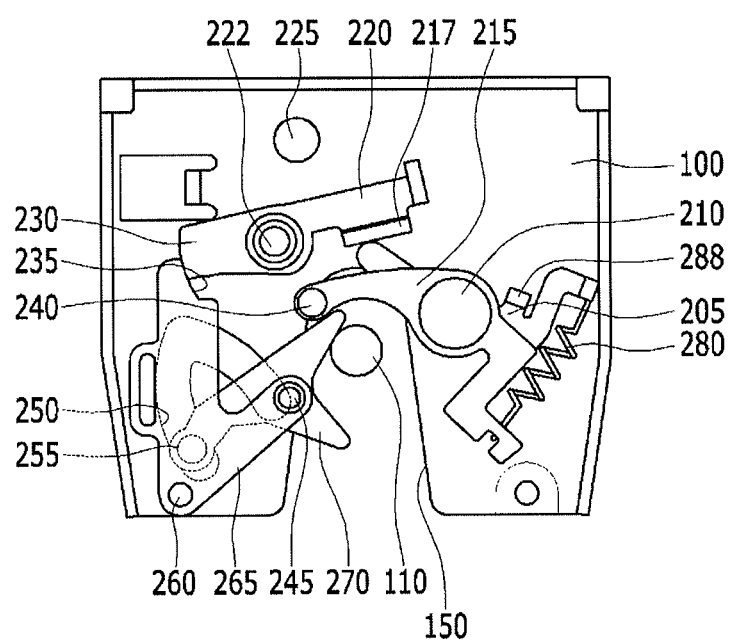
FIG. 2 is an internal front view illustrating the pop-up structure of the tail gate according to various embodiments of the present invention.
Figure 5:
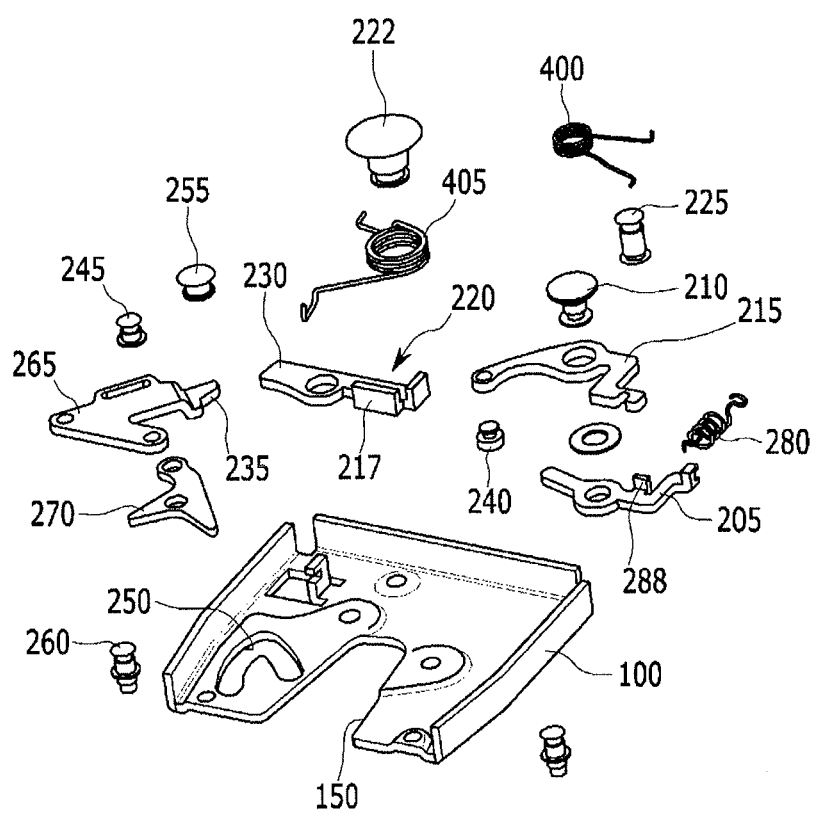
FIG. 5 is a perspective view illustrating the pop-up structure of the tail gate according to various embodiments of the present invention.

FIG. 2 is an internal front view illustrating the pop-up structure of the tail gate according to various embodiments of the present invention, and FIG. 5 is a perspective view illustrating the pop-up structure of the tail gate according to various embodiments of the present invention.

The structure of FIG. 2 may have the same or similar parts as those of FIG. 1, or include different components from those of FIG. 1. Alternatively, the components of FIG. 1 and FIG. 2 may be selected to embody the technical idea of various embodiments of the present invention.

Referring to FIG. 2 and FIG. 5, the pop-up structure of the tail gate includes a bracket 100, a push lever pin 210, a first rotation prevention protrusion 288, a second rotation preventing protrusion 488, a lock lever 205, a push lever spring 280, an entry home 150, a striker 110, a rotation lever 270, a rotation lever pin 245, a pop-up lever 265, a pop-up lever pin 260, a guide pin 255, a guide slit 250, a push pin 240, a second locking bump 235, a second stopper 230, a pop-up pawl pin 222, a spring pin 225, a pop-up pawl 220, a support portion 217, a push lever 215, a pop-up pawl spring 400 and a pop-up lever spring 405.

According to various embodiments of the present invention, the ratchet plate 130 and the locking lever 122 described in FIG. 1 are disposed at the bracket 100. In FIG. 2, the ratchet plate 130 and the locking lever 122 are omitted, and the specific description is referred to in FIG. 1

Referring to FIG. 1 and FIG. 2, the entry home 150 is formed from a lower portion to an upper side portion, and the striker 110 disposed at the vehicle body is relatively inserted into the entry home 150 when the tail gate descends.

The striker 110 enters into the ratchet home when the striker 110 rises. Further, the ratchet plate 130 rotates in the counterclockwise direction, the ratchet home 132 faces upper side, and the first locking bump 137 of the ratchet plate 130 is supported by the first stopper 120. Accordingly, movement of the striker 110 is fixed by the ratchet home 132 of the ratchet plate 130 to be locked.

Further, in the locking state of the ratchet plate 130 and the striker 110, the pop-up structure according to various embodiments of the present invention operates when the first locking lever 122 is pulled by the driver 140 and the ratchet plate 130 rotates in the clockwise direction.

Hereafter, the pop-up structure according to various embodiments of the present invention will be described in detail with reference to the FIG. 2.

Referring to FIG. 2, the pop-up lever 265 is rotatably disposed about the pop-up lever pin 260 at the left lower portion of the entry home 150 of the bracket 100.

The rotation lever pin 245 is disposed at the one side front end portion of the pop-up lever 265, and the rotation lever 270 is rotatably disposed about the rotation lever pin 245 at the one side front end portion of the pop-up lever 265.

The second locking bump 235 is formed at the other side front end portion of the lever 265, and the second stopper 230 formed at the front end portion of the pop-up pawl 220 supports the second locking bump 235 to prevent the pop-up lever 265 from rotating in the clockwise direction.

Figure 4:
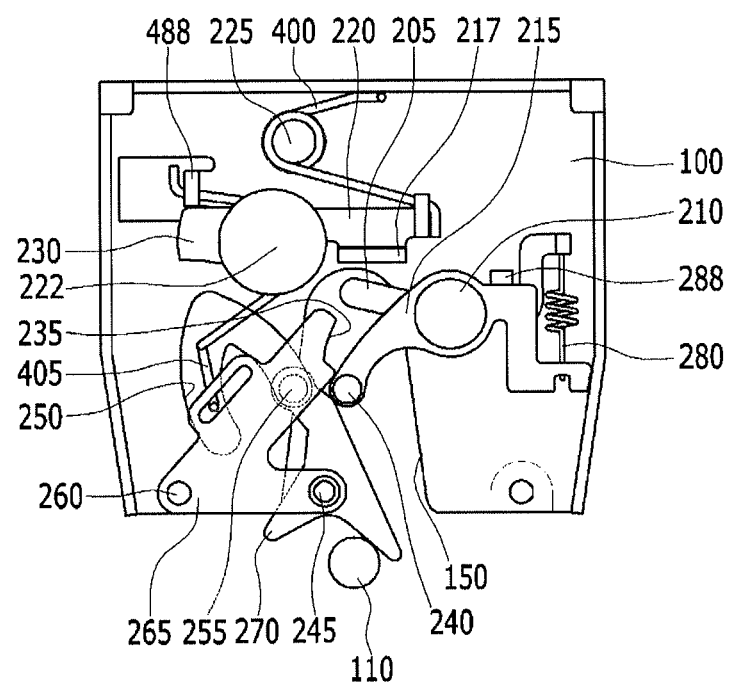
FIG. 4 is an internal front view illustrating a pop up state in the pop-up structure of the tail gate according to various embodiments of the present invention.

The pop-up pawl 220 is rotatably disposed about the pop-up pawl pin 222 disposed on the left upper side of the entry home 150. Referring to FIG. 4, the pop-up lever spring 405 elastically supports so that the pop-up lever 265 rotates in the clockwise direction about the pop-up lever pin 260.

Here, the pop-up pawl spring 400 is disposed at the spring pin 225 disposed at the bracket 100, and the pop-up spring 405 is fixed at the bracket 100 by the popup pawl pin 222.

Referring to FIG. 2 again, the push lever pin 210 is disposed at the right upper side of the entry home 150, and the push lever 215 and the lock lever 205 are rotatably disposed at the bracket 100 about the push lever pin 210.

The push lever pin 210 is fixed at the bracket 100 penetrating the center portion in the length direction of the push lever 215 and the lock lever 205, and the push pin 240 that is able to push the upper side of the rotation lever 270 to downward is disposed at the front end portion of the push lever 215.

Further, the front end portion of the lock lever 205 may contact the right lower face of the pop-up pawl 220, and the rear end portions of the push lever 215 and the lock lever 205 is connected with each other by the push lever spring 280.

The push lever spring 280 pulls and elastically supports the rear end portions of the push lever 215 and the lock lever 205 to separate the front end portions of the push lever 215 and the lock lever 205.

That is, the push pin 240 disposed at the front end portion of the push lever 215 elastically supports the upper surface downward and the front end portion of the lock lever 205 elastically supports the lower end portion of the pop-up pawl 220 upward by elastic force of the push lever spring 280.

Figure 3:
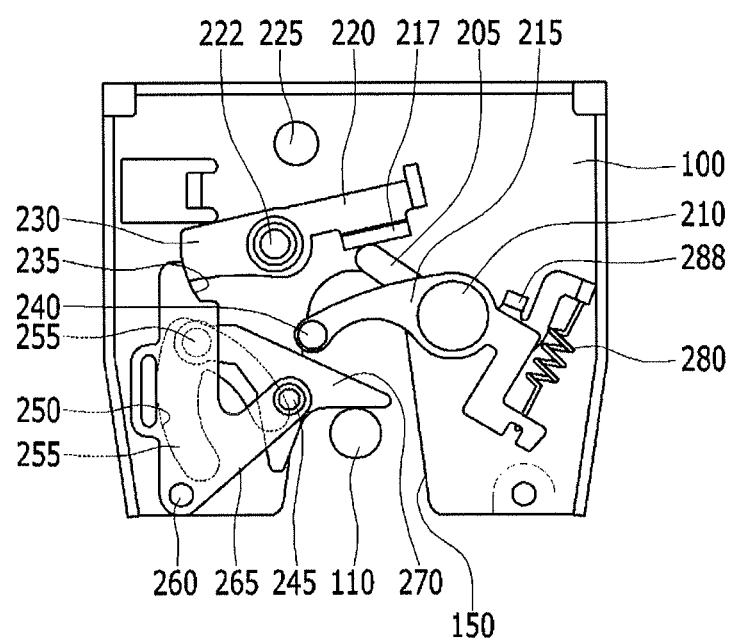
FIG. 3 is an internal front view illustrating a pop up process in the pop-up structure of the tail gate according to various embodiments of the present invention.

FIG. 3 is an internal front view illustrating a pop up process in the pop-up structure of the tail gate according to various embodiments of the present invention.

Referring to FIG. 3, the ratchet plate 130 rotates in the clockwise direction when the front end portion of the locking lever 122 is pulled by the driver 140, and the striker 110 may be separated from the ratchet home 132 of the ratchet plate 130.

That is, the push lever 215 pushes the striker 110 to the downward direction through the rotation lever 270 and the pop-up lever 265 pushes the striker 110 to the downward direction through the rotation lever 270 to implement the pop-up structure of the tail gate.

More specifically, the first locking bump 137 and the first stopper 120 are separated from each other, the ratchet plate 130 rotates, the ratchet home 132 faces downward direction, the push lever 215 rotates in the counterclockwise by elastic force of the push lever spring 280, and the push pin 240 presses the rotation lever 270 to downward direction.

Next, the rotation lever 270 rotates in the clockwise direction about the rotation lever pin 245 by force applied from the push pin 240 and pushes the striker 110 downward, and the guide pin 255 disposed at the rear end portion of the rotation lever 270 moves from downward of the slit 250 to the upper side.

FIG. 4 is an internal front view illustrating a pop up state in the pop-up structure of the tail gate according to various embodiments of the present invention.

Referring to FIG. 3 and FIG. 4, the push lever 215 rotates in the counterclockwise direction about the push lever pin 210. Accordingly, the lock lever 205 rotates in the counterclockwise direction at the push lever pin 210.

That is, the front end portion of the lock lever 205 supporting the support portion 217 of the pop-up pawl 220 rotates in the counterclockwise direction about the push lever pin 210, and support force that the front end portion of the lock lever 205 supports the support portion 217.

Accordingly, the pop-up pawl 220 rotates in the clockwise direction about the pop-up pawl pin 222. Here, the pop-up pawl spring 400 elastically supports the pop-up pawl 220 in the clockwise direction, and in the state that the support force of the lock lever 205 about the support portion 217 of the pop-up pawl 220 is eliminated, the pop-up pawl 220 rotates in the clockwise direction.

Next, when the pop-up pawl 220 rotates in the clockwise direction, the second stopper 230 is separated from the second locking bump 235 of the pop-up lever 265, and the pop-up lever 265 rotates in the clockwise direction about the pop-up lever pin 260 by the pop-up lever spring 405.

At this time, the rotation lever 270 moves to the downward direction through the rotation lever pin 245 connected to the pop-up lever 265, and the front end portion of the rotation lever 270 pushes the striker 110 to the downward direction. Here, the rear end portion of the rotation lever 270 moves to the downward direction along the guide silt 250 by the guide pin 255.

Further, the second rotation preventing protrusion 488 limiting clockwise direction rotational region of the pop-up pawl 220 is formed at the bracket 100, and the first rotation preventing protrusion 288 limiting clockwise direction rotational region of the push lever 215 is formed at the lock lever 205.

Figure 6:
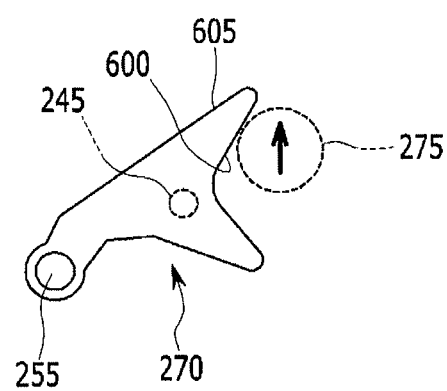
FIG. 6 is a detailed front view illustrating the pop-up structure of the tail gate according to various embodiments of the present invention.

FIG. 6 is a detailed front view illustrating the pop-up structure of the tail gate according to various embodiments of the present invention.

Referring to FIG. 6, concave push home 600 is formed at the front end surface of the rotation lever 270, and the striker 110 is easily disposed inside of the push home 600.

The rotation lever pin 245 is disposed at the center portion of the rotation lever 270, and the rotation lever 270 is rotatably disposed at one end portion of the pop-up lever 265 through the rotation lever pin 245.

Further, the guide pin 255 moving along the guide silt 250 is disposed at the rear end portion of the rotation lever 270.

Figure 7:
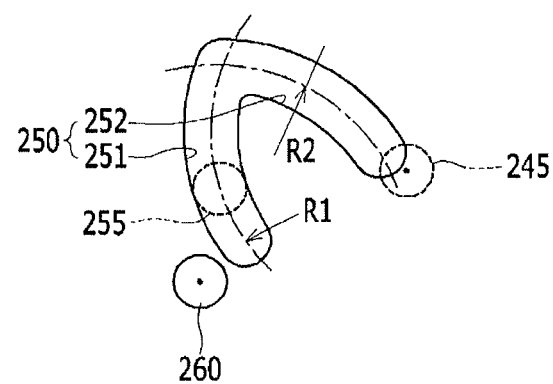
FIG. 7 is a detailed front view illustrating a guide slit in the pop-up structure of the tail gate according to various embodiments of the present invention.

FIG. 7 is a detailed front view illustrating a guide slit in the pop-up structure of the tail gate according to various embodiments of the present invention.

Referring to FIG. 7, the guide slit 250 includes a first 251 and a second slit 252. The first slit 251 is formed having a radius predetermined from a lower side to an upper side, the second slit 252 is formed having a radius predetermined from the upper side to the entry home 150 side, and the first slit 251 and the second slit 252 are connected with each other.

Accordingly, the guide pin 255 disposed at the rear end portion of the rotation lever 270 may move along the first slit 251 and the second slit 252.

In the state that the second locking bump 235 of the pop-up lever 265 is prevented from rotating by the second stopper 230 of the pop-up pawl 220, the first slit 251 is formed along a first radius R1 predetermined about the rotation lever pin 245.

Further, the second slit 252 is formed along a second radius R2 predetermined about the pop-up lever pin 260, and the upper sides of the first slit 251 and the second slit 252 are connected with each other.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed:

1. A pop-up structure of a tail gate, the pop-up structure comprising:
    the tail gate disposed to open and close a passage of a vehicle body;
    a striker to be fixed to the vehicle body;
    a locking device mounted on the tail gate and locked to the striker to fix the tail gate to the vehicle body; and
    a pop-up device disposed at the tail gate and pushing against the striker to lift the tail gate when the locking device is unlocked from the striker,
    wherein the pop-up device includes:
        a bracket mounted on the tail gate;
        a pop-up lever rotatably disposed about a pop-up lever pin on the bracket;
        a rotation lever disposed to rotate about a rotation lever pin which is disposed on an end portion extended to a first side from the pop-up lever, wherein a push home pushing the striker is formed on a front end portion of the rotation lever and is disposed to move along a guide slit formed on the bracket through a guide pin which is mounted on a rear end portion of the rotation lever and slidably engaged in the guide slit, to rotate in a first direction about the rotation lever pin; and
        a pop-up lever spring elastically supporting the pop-up lever to rotate in the first direction such that the striker disposed on the push home of the rotation lever is separated outward from the bracket.

2. The pop-up structure of the tail gate of claim 1,
    wherein a locking bump is formed at an end portion extended to a second side from the pop-up lever; and
    wherein a pop-up pawl is disposed to rotate about a pop-up pawl pin on the bracket and has a stopper supporting the locking bump at a first side end portion so that the pop-up lever does not rotate in the first direction.

3. The pop-up structure of the tail gate of claim 2, further comprising:
    a lock lever rotatably disposed about a push lever pin disposed on the bracket and a front end portion disposed to support a support portion of the pop-up pawl;
    a push lever rotatably disposed about the push lever pin and a front end portion disposed to contact an outer surface of the push home at the rotate lever; and
    a push lever spring respectively connected to and pulling a rear end portion of the push lever and a rear end portion of the lock lever so that the lock lever interrupts rotation of the pop-up pawl in the first direction and the stopper of the pop-up pawl supports the locking bump of the pop-up lever by a pulling tension force.

4. The pop-up structure of the tail gate of claim 3, wherein a push pin is disposed on the front end portion of the push lever, and the push pin is disposed to contact an upper side surface of the rotate lever.

5. The pop-up structure of the tail gate of claim 3, wherein in a state in which the stopper of the pop-up pawl supports the locking bumper of the pop-up lever to restrict the pop-up lever from rotating in the first direction and the striker supports inside upper side surface of the push home upwardly so that the rotation lever is rotated to a second direction about the rotation lever pin,
    the guide slit includes:
        a first slit formed along a predetermined first radius about the rotation lever pin and having a width within which the guide pin is movable; and
        a second slit connected to an upper end portion of the first slit and formed along a predetermined second radius about the pop-up lever pin and having a width within which the guide pin is movable.

6. The pop-up structure of the tail gate of claim 3, wherein the guide slit includes:
    a first slit formed along a predetermined curvature from a lower side to an upper side; and
    a second slit formed at the lower side along a predetermined curvature at an upper end portion to the direction the striker is disposed.

7. The pop-up structure of the tail gate of claim 3, wherein the push lever spring pulls the rear end portion of the push lever to apply elastic force such that the front end of the push lever pushes the rotation lever outward.

8. The pop-up structure of the tail gate of claim 3, further comprising a pop-up pawl spring disposed on the bracket and elastically supporting the pop-up pawl to rotate in a second direction to apply elastic force so that the stopper of the pop-up pawl is separated from the locking bump.

9. The pop-up structure of the tail gate of claim 3, wherein the locking device includes:
- a ratchet plate disposed to rotate through a ratchet pin at the bracket, and a latchet home in which the striker is inserted and locked is formed at a first side, and a first locking bump is formed at an outside thereof;
- a locking lever disposed to rotate about the stopper pin at the bracket, and a locking stopper supporting the first locking bump at a front end portion and preventing the ratchet plate from rotating in the first direction is formed; and
- a hatch spring rotating the ratchet plate in the first direction to apply elastic force so that the striker is output from the ratchet home of the ratchet plate.

10. The pop-up structure of the tail gate of claim 9, further comprising:
- a driving device pulling or pushing a first side of the locking lever so that the first stopper is separated from the first locking bump; and
- a switch generating signal operating the driving device.

* * * * *